United States Patent Office 3,432,519
Patented Mar. 11, 1969

3,432,519
CERTAIN 3-SUBSTITUTED-5-THIOPHOSPHORYL-METHYL-1,2,4-OXADIAZOLES
Jean Metivier and Michel Sauli, Paris, France, assignors to Rhone-Poulenc S.A., Paris, France, a French body corporate
No Drawing. Filed May 13, 1966, Ser. No. 549,792
Claims priority, application France, May 18, 1965, 17,463; Feb. 22, 1966, 50,596
U.S. Cl. 260—307
Int. Cl. C07d 85/52; A01n 9/36
7 Claims

ABSTRACT OF THE DISCLOSURE

The invention provides new 3-substituted-5-thiophosphorylmethyl-1,2,4-oxadiazoles which are useful as insecticides and acaricides.

---

This invention relates to new phosphoric esters, to a process for their preparation, and pesticidal compositions containing them.

According to the present invention, there are provided the new phosphoric esters of the general formula:

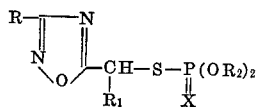
I wherein R represents a hydrogen atom, an alkyl group containing 1 to 6 carbon atoms optionally carrying an alkoxy substituent containing 1 to 4 carbon atoms, or an aryl group (preferably phenyl) which may carry one or more substituents selected from halogen atoms, the nitro group, and alkyl, alkoxy and alkylthio groups containing 1 to 4 carbon atoms, $R_1$ represents a hydrogen atom or an alkyl group containing 1 to 4 carbon atoms, $R_2$ represents an alkyl group containing 1 to 4 carbon atoms, and X represents an oxygen or sulphur atom.

According to a feature of the invention, these phosphoric esters are obtained by reacting a phosphorus compound of the general formula:

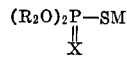
II (wherein $R_2$ and X are as hereinbefore defined and M represents an alkali metal atom or an ammonium ion) with an oxadiazole derivative of the general formula:

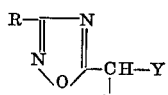
III wherein Y represents the acid residue of a reactive ester such as a halogen atom or a sulphuric or sulphonic ester residue, and R and $R_1$ are as hereinbefore defined. When the symbol M in Formula II represents an alkali metal atom, the salt may be prepared in situ.

The reaction is preferably carried out in an inert organic solvent and more particularly in an alcohol (e.g. ethanol), a ketone (e.g. acetone or methyl ethyl ketone), an ester (e.g. ethyl acetate), a nitrile (e.g. acetonitrile) or an aromatic hydrocarbon (e.g. benzene), at a temperature between normal temperature, i.e. 10–25° C., and 120° C.

The phosphoric esters of general Formula I have remarkable insecticidal and acaricidal properties; they are effective through contact, ingestion or systemically. Preferred esters are those in which $R_1$ represents a hydrogen atom and $R_2$ represents a methyl or ethyl group, and more particularly those in which R represents a phenyl group optionally carrying one or two chlorine atoms, e.g. 4-chlorophenyl or 2,4-dichlorophenyl. Esters of outstanding importance are 3-phenyl-5-O,O-dimethyldithiophosphorylmethyl-1,2,4-oxadiazole,
3-phenyl-5-O,O-diethyldithiophosphorylmethyl-1,2,4-oxadiazole,
3-(4-chlorophenyl)-5-O,O-dimethyldithiophosphorylmethyl-1,2,4-oxadiazole,
3-(4-chlorophenyl)-5-O,O-diethyldithiophosphorylmethyl-1,2,4-oxadiazole,
3-(2,4-dichlorophenyl)-5-O,O-dimethyldithiophosphorylmethyl-1,2,4-oxadiazole and
3-(2,4-dichlorophenyl)-5-O,O-diethyldithiophosphorylmethyl-1,2,4-oxadiazole.

According to a further feature of the present invention there are provided pesticidal compositions containing at least one phosphoric ester of Formula I in association with one or more diluents compatible with the phosphoric ester and suitable for use in agricultural pesticidal compositions. Preferably the compositions contain between 0.005 and 90% by weight of phosphoric ester. The compositions may be solid if there is employed a powdered solid compatible diluent such as talc, calcined magnesia, kieselguhr, tricalcium phosphate, powdered cork, absorbent charcoal, or a clay such as kaolin or bentonite. Instead of a solid diluent, there may be used a liquid in which the phosphoric ester is dissolved or dispersed. The compositions may thus take the form of suspensions, emulsions or solutions in organic or aqueous-organic media, for example aromatic hydrocarbons such as toluene or xylene or mineral, animal or vegetable oils, or mixtures of these diluents. The compositions in the form of suspensions, emulsions or solutions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When emulsions are required, the phosphoric esters may be used in the form of self-emulsifying concentrates containing the active substance dissolved in the emulsifying agent or in a solvent containing an emulsifying agent compatible with the phosphoric ester and solvent, a simple addition of water to such concentrates producing compositions ready for use.

The solid compositions are preferably prepared by grinding the phosphoric ester with the solid diluent, or by impregnating the solid diluent with a solution of the phosphoric ester in a volatile solvent, evaporating the solvent, and if necessary grinding the product so as to obtain a powder, and may optionally incorporate a wetting or dispersing agent, for example of the types hereinbefore described.

The phosphoric ester of Formula I are preferably employed for pesticidal purposes in a quantity of 5 to 100 g. of phosphoric ester per hectolitre of water.

The following examples illustrate the invention.

EXAMPLE I

Ammonium O,O-diethyldithiophosphate (13 g.) is added to a solution of 3-phenyl-5-chloromethyl-1,2,4-oxadiazole (12 g.) in acetone (150 cc.). The reaction mixture is stirred for 8 hours at laboratory temperature. After standing overnight, the precipitate of ammonium chloride which forms is filtered off and the acetone solution is concentrated under reduced pressure. The residual oil is taken up in methylene chloride (150 cc.) and the solution obtained is successively washed with water (100 cc.), a 10% aqueous solution of potassium bicarbonate (100 cc.), and water (100 cc.). After drying over anhydrous sodium sulphate and concentration under reduced pressure, 3-phenyl-5-O,O-diethyldithiophosphorylmethyl-1,2,4-oxadiazole (20 g.) is obtained in the form of an oil.

The 3-phenyl-5-chloromethyl-1,2,4-oxadiazole (M.P. 38° C.) used as the starting compound is prepared according to the method described by G. Palazzo et coll. J. Med. Pharm. Chem. 4, 351 (1961).

EXAMPLE II

Ammonium O,O-diethyldithiophosphate (13.8 g.) is added to a solution of 3-methyl-5-chloromethyl-1,2,4-oxadiazole (9 g.) in acetone (150 cc.). The reaction mixture is stirred for 5 hours at laboratory temperature. The precipitate of ammonium chloride which forms is filtered off and the acetone solution is concentrated under reduced pressure. The residual oil is taken up in methylene chloride (150 cc.) and the solution obtained is successively washed with water (100 cc.), a 10% aqueous solution of potassium bicarbonate (100 cc.), and water (100 cc.). After drying over anhydrous sodium sulphate and concentration under reduced pressure, 3-methyl-5-O,O-diethyldithiophosphorylmethyl-1,2,4-oxadiazole (16 g.) is obtained in the form of an oil (B.P. 140–143° C./0.4 mm. Hg).

The 3-methyl-5-chloromethyl-1,2,4-oxadiazole (B.P. 80–81° C./28 mm. Hg) used as starting material is prepared by cyclisation of O-chloracetylacetamidoxime, itself prepared by the reaction of chloracetyl chloride with acetamidoxime in an analogous manner to the method described by G. Palazzo et coll, loc.cit., for the corresponding 3-phenyl derivative.

EXAMPLE III

Ammonium O,O-dimethyldithiophosphate (12.3 g.) is added to a solution of 3-methyl-5-chloromethyl-1,2,4-oxadiazole (9 g.) in acetone (150 cc.). The reaction mixture is stirred for 8 hours at laboratory temperature. After standing overnight, the precipitate of ammonium chloride which forms is filtered off and the acetone solution is concentrated under reduced pressure. The residual oil is taken up in methylene chloride (200 cc.), and the solution obtained is washed successively with water (100 cc.), a 10% aqueous solution of potassium bicarbonate (100 cc.), and water (100 cc.). After drying over anhydrous sodium sulphate and concentration under reduced pressure, 3-methyl-5-O,O-dimethyldithiophosphorylmethyl-1,2,4-oxadiazole (16.5 g.) is obtained in the form of an oil.

The products identified in the following table are prepared by the procedure described above and starting with appropriate starting materials.

TABLE

| R | $R_1$ | $R_2$ | X | |
|---|---|---|---|---|
| $-CH_3$ | $-H$ | $-C_2H_5$ | $-O-$ | B.P. 145–150° C./0.5 mm. Hg |
| $-(CH_3)_3$ | $-H$ | $-C_2H_5$ | $-S-$ | Oil. |
| $-C(CH_3)_3$ | $-H$ | $-CH_3$ | $-S-$ | Oil. |
| $-CH_2OCH_3$ | $-H$ | $-C_2H_5$ | $-S-$ | Oil. |
| $-C_6H_5$ | $-H$ | $-CH_3$ | $-S-$ | Oil. |
| $-C_6H_4-OCH_3$ | $-H$ | $-CH_3$ | $-S-$ | M.P. 52° C. |
| $-C_6H_4-OCH_3$ | $-H$ | $-C_2H_5$ | $-S-$ | Oil. |
| $-C_6H_4-Cl$ | $-H$ | $-C_2H_5$ | $-S-$ | S.P. 36° C. |
| $-C_6H_4-Cl$ | $-H$ | $-CH_3$ | $-S-$ | S.P. 26–27° C. |
| $-C_6H_3Cl_2$ | $-H$ | $-C_2H_5$ | $-S-$ | Oil. |
| $-C_6H_3Cl_2$ | $-H$ | $-CH_3$ | $-S-$ | Oil. |

S.P. = solidification point.

The 3-t.-butyl-5-chloromethyl-1,2,4-oxadiazole (B.P. 104° C./32 mm. Hg) and the 3-(4-methoxyphenyl)-5-chloromethyl-1,2,4-oxadiazole (M.P. 54° C.) used as starting materials are prepared according to the method described by G. Palazzo et coll., loc. cit., for the corresponding 3-phenyl derivative. The 3-(4-chlorophenyl)- and 3-(2,4-dichlorophenyl)-5-chloromethyl-1,2,4-oxadiazole starting materials are also prepared according to that method.

The following example illustrates pesticidal compositions according to the invention.

EXAMPLE IV

A condensation product of octylphenol and ethylene oxide containing 10 moles of ethylene oxide per mole of octylphenol (10 parts by weight) is added to a solution of 3-methyl-5-O,O-diethyldithiophosphorylmethyl-1,2,4-oxadiazole (25 parts by weight) in a mixture of equal parts (by volume) of toluene and acetophenone (65 parts). The solution obtained is used, after dilution with water in the ratio of 200 cc. of this solution per 100 litres of water, to destroy greenfly, red spiders, and caterpillars.

We claim:

1. A phosphoric ester of the formula:

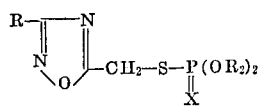

wherein R represents phenyl, or phenyl carrying one or two chlorine atoms, $R_2$ represents methyl or ethyl, and X represents oxygen or sulphur.

2. The phosphoric ester according to claim 1 wherein R is phenyl, $R_2$ is methyl, and X is sulphur.
3. The phosphoric ester according to claim 1 wherein R is phenyl, $R_2$ is ethyl, and X is sulphur.
4. The phosphoric ester according to claim 1 wherein R is 4-chlorophenyl, $R_2$ is methyl, and X is sulphur.
5. The phosphoric ester according to claim 1 wherein R is 4-chlorophenyl, $R_2$ is ethyl, and X is sulphur.
6. The phosphoric ester according to claim 1 wherein R is 2,4-dichlorophenyl, $R_2$ is methyl, and X is sulphur.
7. The phosphoric ester according to claim 1 wherein R is 2,4-dichlorophenyl, $R_2$ is ethyl, and X is sulphur.

References Cited

UNITED STATES PATENTS 3,227,725  1/1966  Eloy et al. _____ 260—307

FOREIGN PATENTS 713,278  8/1954  Great Britain.
932,388  7/1963  Great Britain.

ALTON D. ROLLINS, Primary Examiner.

U.S. Cl. X.R

424—200